(12) United States Patent
Germann et al.

(10) Patent No.: US 6,819,841 B2
(45) Date of Patent: Nov. 16, 2004

(54) SELF-ALIGNED OPTICAL WAVEGUIDE TO OPTICAL FIBER CONNECTION SYSTEM

(75) Inventors: Roland Germann, Wangen (CH); David V. Horak, Essex Junction, VT (US); Akihisa Sekiguchi, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 10/232,072

(22) Filed: Aug. 29, 2002

(65) Prior Publication Data

US 2004/0062484 A1 Apr. 1, 2004

(51) Int. Cl.⁷ .................................................. G02B 6/30
(52) U.S. Cl. .............................. 385/49; 385/50; 385/52
(58) Field of Search ................. 385/52, 49, 129–132, 385/50–51

(56) References Cited

U.S. PATENT DOCUMENTS

| | | | |
|---|---|---|---|
| 4,639,074 A | | 1/1987 | Murphy |
| 4,768,199 A | * | 8/1988 | Heinen et al. ............. 372/36 |
| 5,299,276 A | * | 3/1994 | Okamura et al. .......... 385/130 |
| 5,319,725 A | | 6/1994 | Buchmann et al. |
| 5,355,386 A | | 10/1994 | Rothman et al. |
| 5,361,382 A | | 11/1994 | Nakamura et al. |
| 5,579,424 A | | 11/1996 | Schneider |
| 5,641,612 A | | 6/1997 | Lee et al. |
| 5,721,797 A | | 2/1998 | Basavanhally et al. |
| 5,787,214 A | * | 7/1998 | Harpin et al. ............. 385/49 |
| 5,896,481 A | * | 4/1999 | Beranek et al. ........... 385/90 |
| 5,909,524 A | | 6/1999 | Tabuchi |
| 5,974,214 A | | 10/1999 | Shacklette et al. |
| 6,112,001 A | | 8/2000 | Kishida et al. |
| 6,160,936 A | * | 12/2000 | You et al. ................. 385/49 |
| 6,163,639 A | | 12/2000 | Ollier et al. |
| 6,222,967 B1 | | 4/2001 | Amano et al. |
| 6,250,819 B1 | | 6/2001 | Porte et al. |
| 2002/0197015 A1 | * | 12/2002 | Shaw ....................... 385/49 |

FOREIGN PATENT DOCUMENTS

| | | | | |
|---|---|---|---|---|
| EP | 0718649 | | 6/1996 | |
| EP | 0762162 | | 12/1997 | |
| EP | 0977061 | | 2/2000 | |
| GB | 2191601 A | * | 12/1987 | ............ G02B/6/36 |
| JP | 02251916 A | * | 10/1990 | ............ G02B/6/30 |
| JP | 04340507 A | * | 11/1992 | ............ G02B/6/30 |
| WO | 97/42534 | | 11/1997 | |
| WO | 9822841 | | 5/1998 | |

OTHER PUBLICATIONS

Schreiber Translations, Inc., Translation of "Optical Waveguide Component" [Hikaridohabuhin] Ueki, et al, JP 4–340507.*

* cited by examiner

*Primary Examiner*—Edward J. Glick
*Assistant Examiner*—Krystyna Suchecki
(74) *Attorney, Agent, or Firm*—Schmeiser, Olsen & Watts; William H. Steinberg (57) ABSTRACT

An apparatus for self-aligning an optical fiber to an optical waveguide. The apparatus includes an optical waveguide chip including: one or more optical waveguides formed on a first substrate, each optical waveguide having a protruding portion; and one or more alignment rails formed on the first substrate, each alignment rail spaced apart from each optical waveguide by a predetermined distance; and an alignment jig including: one or more grooves formed in a second substrate, each groove adapted to receive one protruding portion and each groove supporting one optical fiber in alignment with one optical waveguide; and one or more alignment grooves formed on the second substrate, each alignment groove spaced apart from the grooves by the predetermined distance and adapted to mate with the alignment rails.

27 Claims, 13 Drawing Sheets

SELF-ALIGNED OPTICAL WAVEGUIDE TO OPTICAL FIBER CONNECTION SYSTEM

FIELD OF THE INVENTION

The present invention relates to the field of coupling optical fibers to optical waveguides; more specifically, it relates to an apparatus and method for manufacturing self-aligned optical fiber to optical waveguide assembles.

BACKGROUND OF THE INVENTION

There are many applications in optical communications and in optoelectronics where an optical fiber must be connected to an optical waveguide. Connection of an optical fiber to an optical waveguide requires alignment of a face of the optical fiber to the face of an optical waveguide and then bonding of the two faces together. Alignment tolerances of the optical fiber to the optical waveguide must be held to under 1 micron in five degrees of freedom (mutually perpendicular straight X, Y and Z axes as well as a rotational axes about the X and Y axes). The equipment to accomplish this five-fold alignment is expensive and requires a high degree of skill on the part of the person performing the alignment. Five-fold alignment is also time-consuming. Both of these add to the cost of the finished product. Further, with this technique it is extremely difficult or impossible to attach multiple optical fibers to an optical waveguide on very close pitches. An inexpensive method whereby the optical fiber aligns to the optical waveguide would greatly reduce the manufacturing costs of optical communication and optoelectronic devices.

A need therefore exists for an inexpensive method of aligning in the aforementioned five degrees of freedom one or more optical fibers to an optical waveguide.

SUMMARY OF THE INVENTION

A first aspect of the present invention is an apparatus for self-aligning an optical fiber to an optical waveguide comprising: an optical waveguide chip including: one or more optical waveguides formed on a first substrate, each optical waveguide having a protruding portion; and one or more alignment rails formed on the first substrate, each alignment rail spaced apart from each optical waveguide by a predetermined distance; and an alignment jig including: one or more grooves formed in a second substrate, each groove adapted to receive one protruding portion and each groove supporting one optical fiber in alignment with one optical waveguide; and one or more alignment grooves formed on the second substrate, each alignment groove spaced apart from the grooves by the predetermined distance and adapted to mate with the alignment rails.

A second aspect of the present invention is an apparatus for self-aligning an optical fiber to an optical waveguide comprising: an optical waveguide chip including: one or more optical waveguides formed on a first substrate, each optical waveguide having a cladding layer extending over a top surface of the first substrate and a protruding portion, the protruding portion including a core portion and a cladding portion; and one or more alignment rails formed on top of the cladding layer, each alignment rail substantially co-planer with the core portion and spaced apart from each core portion by a predetermined distance; and an alignment jig including: one or more trenches in a thick layer on top of a second substrate and one or more grooves formed in the second substrate, each groove open to one trench; each groove adapted to receive one protruding portion and to support one optical fiber in alignment with one optical waveguide; and one or more alignment grooves formed in the thick layer, each alignment groove spaced apart from the grooves by the predetermined distance and adapted to mate with the alignment rails.

A third aspect of the present invention is a method for making a self-aligned connection between an optical fiber and an optical waveguide, comprising: providing a first substrate; forming a first cladding layer on top of the first substrate; forming a core layer on top of the first cladding layer; etching the core layer to form a waveguide core and one or more alignment rails, each alignment rail spaced apart from the waveguide core by a predetermined distance; forming a second cladding on a top surface and on sidewalls of the waveguide core, the waveguide core and second cladding forming a protruding portion of the waveguide, the first cladding layer, the waveguide core and the second cladding forming the optical waveguide; providing a second substrate; forming a mask layer on top of the second substrate; simultaneously etching one or more trenches and one or more alignment grooves in the mask layer, each alignment groove spaced apart from the trench by the predetermined distance and adapted to mate with the alignment rails; etching a groove in the second substrate in each trench, each groove and trench adapted to receive one protruding portion and to support one optical fiber such that a core of the optic fiber aligns with the waveguide core; placing the first substrate onto the second substrate such that the alignment rails engage with the alignment grooves and the protruding portion is received in the groove and trench and placing optical fibers in each trench.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

The processes and fabrication methods related and referenced herein are those used in the manufacture of semiconductor chips unless otherwise noted. The term optical waveguide is intended to include not only discrete optical waveguides but also optical devices having an optical or electro-optical device portion and an optical waveguide portion where both the optical waveguide portion and device portion are fabricated in or on the same substrate and are interconnected. The self-aligned optical waveguide to optical fiber connection system of the present invention requires fabrication of an integrally formed optical waveguide chip and fabrication of an alignment jig used to align the optical waveguide chip to an optical fiber. The fabrication of the optical waveguide chip is discussed first.

Figure 1:
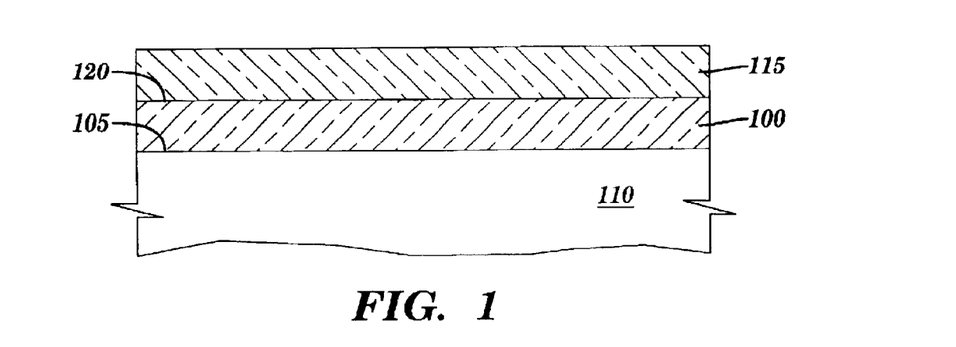
FIGS. 1 through 8 are partial cross-sectional views illustrating fabrication of an optical waveguide chip according to the present invention.

FIGS. 1 through 8 are partial cross-sectional views illustrating fabrication of an optical waveguide chip according to the present invention. In FIG. 1, a first cladding layer 100 is formed on a top surface 105 of a substrate 110. Substrate 110 may be silicon, sapphire or quartz. A core layer 115 is formed on a top surface 120 of first cladding layer 100. In one example first cladding layer 100 is formed, by well-known oxidation or deposition methods, from thermal oxide, high-density plasma (HDP) oxide or tetraethoxysilane (TEOS) oxide boro-silicate glass (BSG) or phosphorus-boro-silicate (BPSG) glass, and is about 5 to 10 microns thick and has an index of refraction of about 1.44 to 1.54. In one example, core layer 115 is silicon-oxy-nitride, is 2 to 3 microns thick and has an index of refraction of about 1.47 to 1.55. However, the refractive index of core layer 115 is greater than the refractive index of first cladding layer 100.

Figure 2:
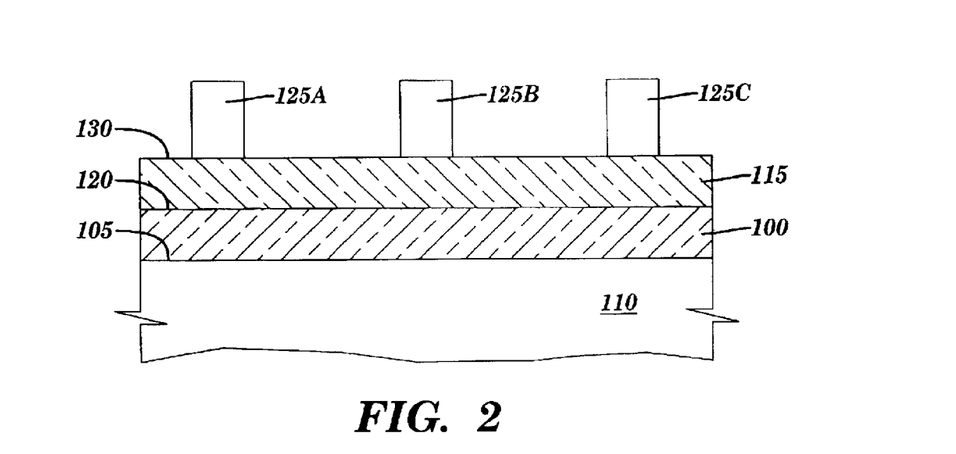

In FIG. 2, photoresist images 125A, 125B and 125C are formed, by well known photolithographic methods, on a top surface 130 of core layer 115.

Figure 3:
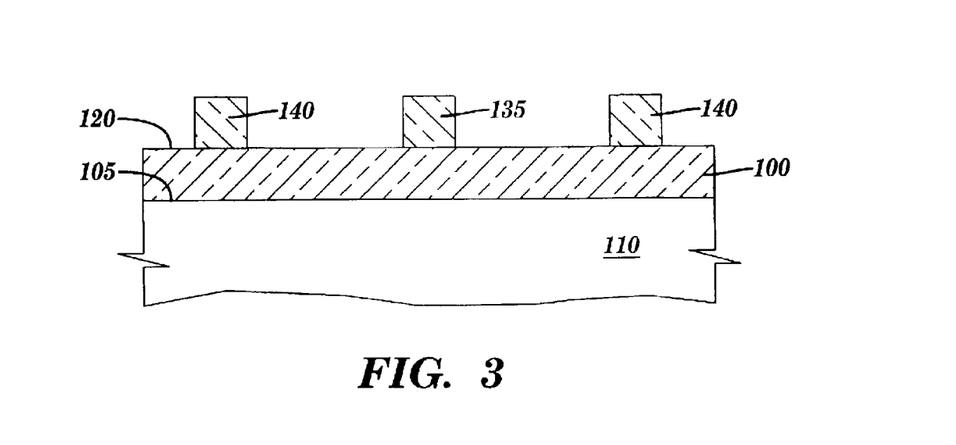

In FIG. 3, a core 135 and rails 140 are formed from core layer 115 by removing portions of the core layer not protected by photoresist images 125A, 125B and 125C (see FIG. 2) down to top surface 120 of first cladding layer 100 using any one of a number of well-known reactive ion etch (RIE) methods selective silicon oxy-nitride to silicon oxides. Photoresist images 125A 125B, and 125C (see FIG. 2) are then removed by wet or dry stripping. First cladding layer 100, core 135 and rails 140 extend perpenicularly into the plane of the drawing. This is more clearly illustrated in FIG. 10 and described below. Since rails 140 are formed at the same time as core 135, the rails are self-aligned to the core.

Figure 4:
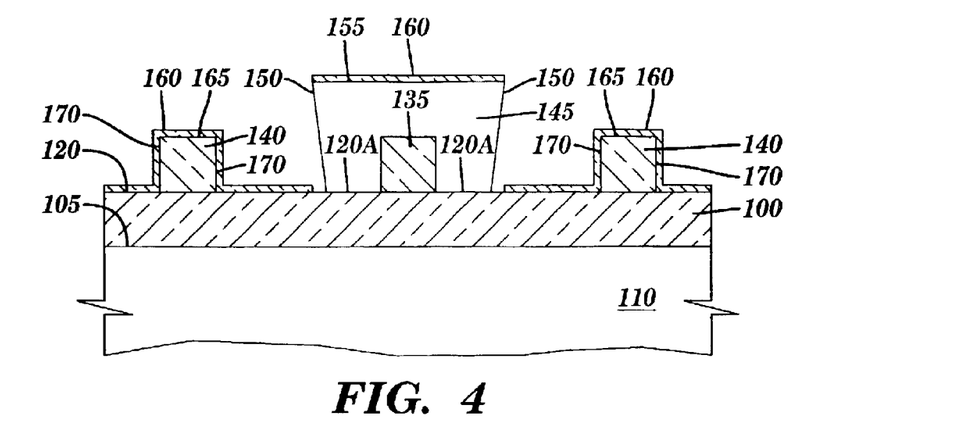

In FIG. 4, a photoresist image 145 is formed over core 135 and immediately adjacent portions 120A of top surface 120 of first cladding layer 100 using well-known lift-off photolithographic techniques. Note that photoresist image 145 has angled sidewalls 150 such that the photoresist image is wider at a top surface 155 of the photoresist image than at portions 120A of top surface 120 of first cladding layer 100. A tapered photoresist sidewall is a well-know attribute of a lift-off photolithographic technique. A conformal protective layer 160 is formed on top surfaces 165 and sidewalls 170 of rails 140, top surface 155 of photoresist image 145 and on exposed top surface(s) 120 of first cladding layer 100. In one example, protective layer 160 is silicon nitride and is about 100 to 300 Å thick and is formed by any one of well-known sputtering, collimated sputtering or other non-conformal deposition processes.

Figure 5:
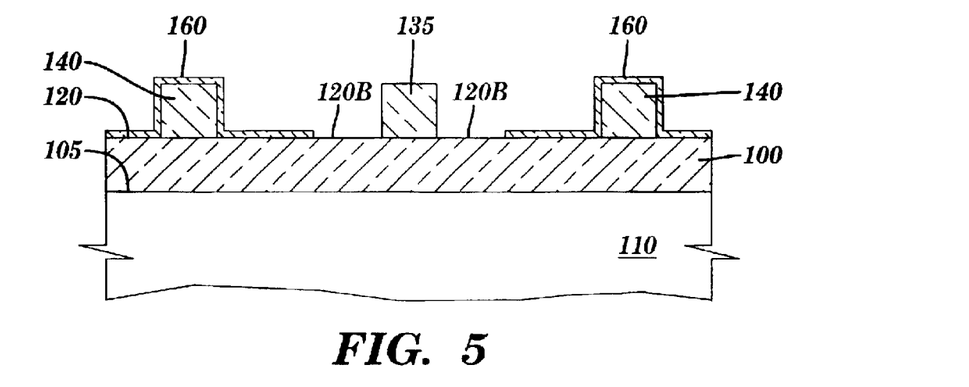

In FIG. 5, photoresist image 145 and that portion of protective layer 160 deposited on top surface 155 of the photoresist image (see FIG. 4) are removed using a solvent that will dissolve the photoresist image. Protective layer 160 covers all of top surface 120 of first cladding layer 120 except for exposed portions 120B immediately adjacent to core 135. The function of protective layer 160 is to protect rails 140 from subsequent processes.

Figure 6:
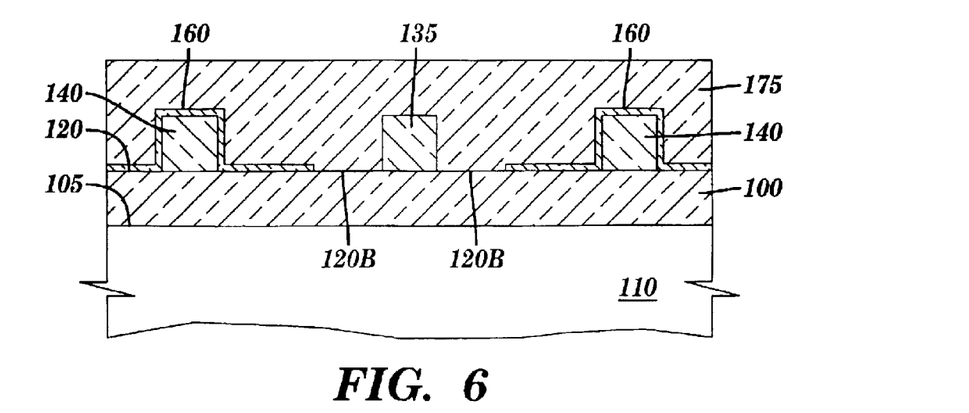

In FIG. 6 a second cladding layer 175 is formed on first cladding layer 100, covering rails 140, protective layer 160, exposed portions 120B of top surface 120 of first cladding layer 100 and core 135. In one example second cladding layer 175 is formed, by well-known deposition methods, from HDP oxide or TEOS oxide, BSG or BPSG, is about 7 to 13 microns thick and has an index of refraction of about 1.44 to 1.54. However, the index of refraction of second cladding 175 is less than the refractive index of core 135. In one, example, the refractive index of second cladding layer 175 is about the same as the refractive index of first cladding layer 100. First cladding layer 100 and second cladding layer 175 may or may not be formed from the same material.

Figure 7:
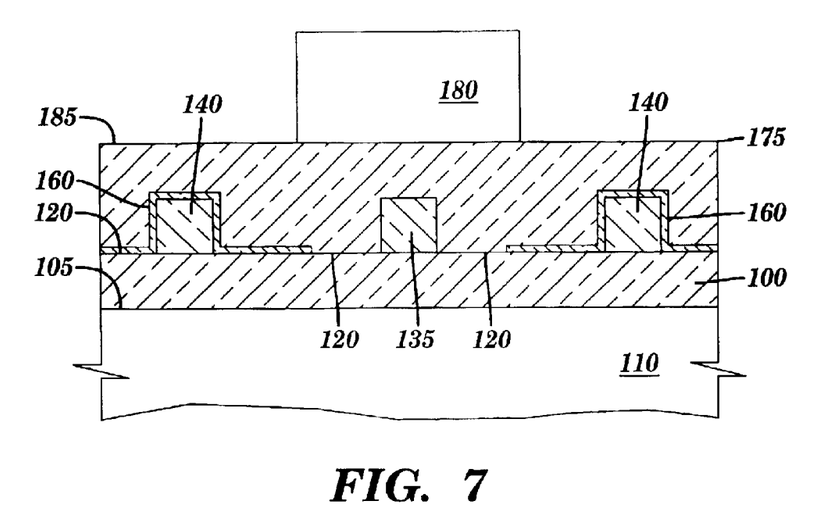

In FIG. 7, a photoresist image 180 is formed on a top surface 185 of second cladding layer 175 and aligned over core 135 using well-known photolithographic techniques.

Figure 8:
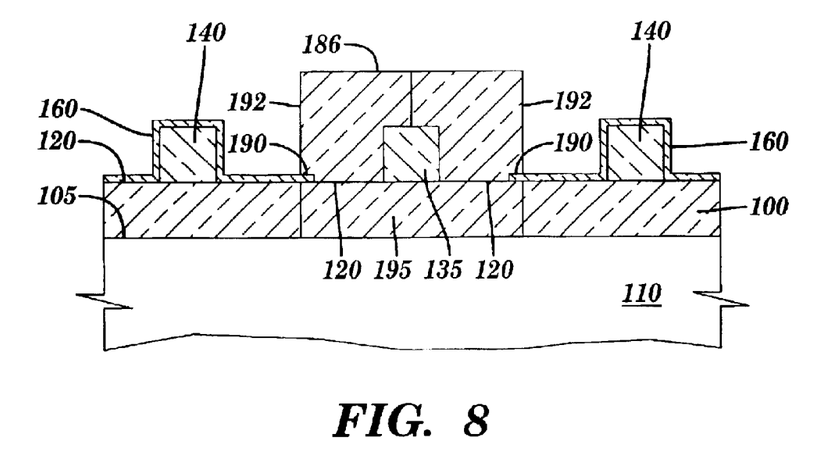

In FIG. 8, an upper cladding 186 is formed from second cladding layer 175 by removing portions of the second cladding layer not protected by photoresist image 180 (see FIG. 7) down to protective layer 160 using any one of a number of well-known RIE methods selective silicon oxides to silicon nitride. Photoresist image 180 (see FIG. 7) is then removed by wet or dry stripping. Upper cladding 186 overlaps edge portions 190 of protective layer 160. Protective layer 160 does not extend under upper cladding 186 all the way to core 135. A lower cladding 195 is defined as an area of first cladding layer 100 aligned approximately to sides 192 of upper cladding 186. Upper cladding 186 extends perpendicularly into the plane of the drawing. This is more clearly illustrated in FIG. 10 and described below.

Figure 9:
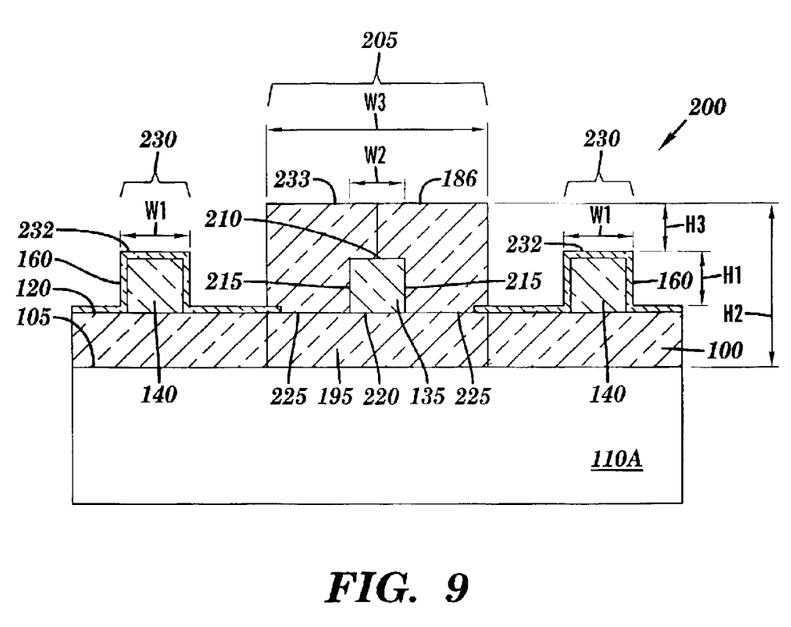
FIG. 9 is a cross-sectional view of an optical waveguide chip according to the present invention.

FIG. 9 is a cross-sectional view of optical waveguide chip 200 according to the present invention. In FIG. 9, optical waveguide chip 200 is cut from substrate 110 (see FIG. 8). Optical waveguide chip 200 includes an integrally formed optical waveguide portion 205, alignment rails 230 and a supporting substrate 110A. Optical waveguide portion 205 includes upper cladding 186 surrounding a top 210 and sidewalls 215 of core 135 and lower cladding 195 contacting a bottom 220 of the core and bottom surface(s) 225 of the upper cladding. Alignment rails 230 include rail 140 and portions of protective coating 160 covering exposed surfaces of the rail. Supporting substrate 110A may contain semiconductor devices and circuits and/or electro-optical devices linked to optical waveguide 205. Alignment rails 230 have a width "W1" and a height "H1." In one example, W1 is about 5 to 10 microns and "H1" is about 2 to 3 microns. Core 135 has a width "W2" and a height "H1." Top surfaces 232 of alignment rails 230 are lower than a top surface 233 of optical waveguide 205 by a distance "H3." Optical waveguide 205 has a width "W3" and a height "H2." In one example, W2 is about 5 to 10 microns, W3 is about 15 to 30 microns, "H2" is about 12 to 23 microns and "H3" is about 5 to 10 microns.

Figure 10:
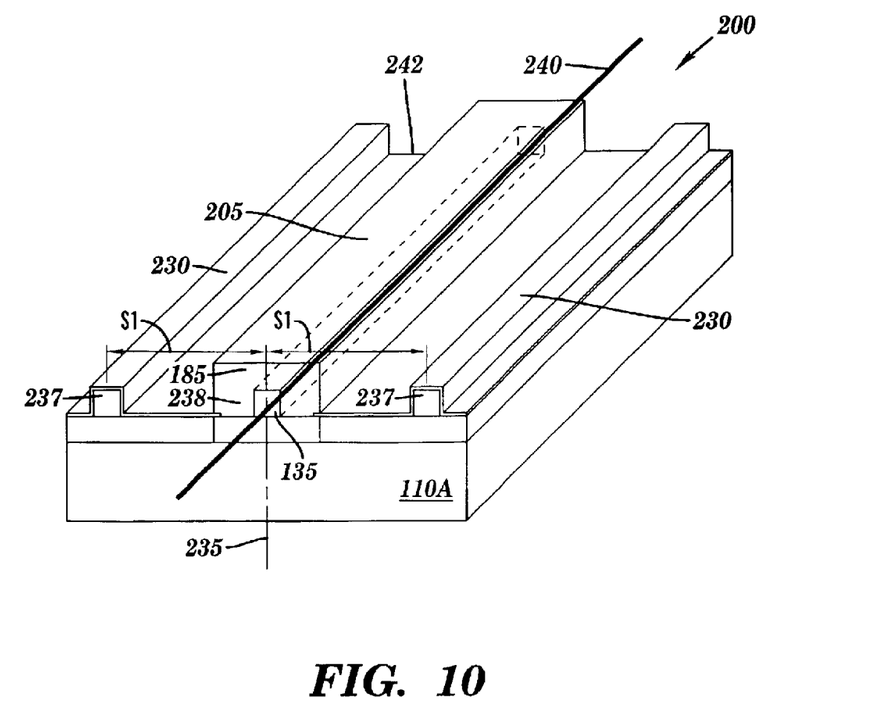
FIG. 10 is a three-dimensional isometric view of the optical waveguide chip of FIG. 9, according to the present invention

FIG. 10 is a three-dimensional isometric view of optical waveguide chip 200 of FIG. 9, according to the present invention. In FIG. 10, at least a front surface 235 of optical waveguide chip 200 is polished optically flat and perpendicular to a longitudinal axis 240 of the optical waveguide chip. Front surface 235 includes ends 237 of alignment rails 230 and an end 238 of waveguide 205. Alignment rails 230 and optical waveguide 205 extend along longitudinal axis 240. Alignment rails 230 extend parallel to and are co-planer with core 135. Centers of alignment rails 230 are spaced a distance "S1" from the center of optical waveguide 205.

While upper cladding 185 and core 135 are illustrated as extending the length of substrate 110A, the upper cladding and core may terminate prior to reaching a back surface 242 of optical waveguide chip 200.

Fabrication of the alignment jig is now illustrated and described.

Figure 11:
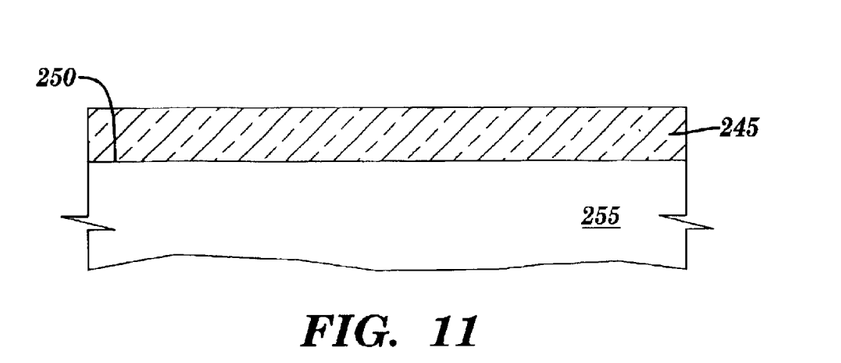
FIGS. 11 through 17A are partial cross-sectional views illustrating fabrication of an alignment jig for aligning the optical waveguide chip of FIG. 9 to an optical fiber according to the present invention.

FIGS. 11 through 17 are partial cross-sectional views illustrating fabrication of an alignment jig for aligning optical waveguide chip 200 to an optical fiber according to the present invention. In FIG. 11, a first hard mask layer 245 is formed on a top surface 250 of a (100) silicon substrate 255 having a <100> crystal orientation relative to the top surface. In one example first hard mask layer 245 is formed, by well-known oxidation or deposition methods, from thermal oxide, HDP oxide or TEOS oxide and is about 5 to 10 microns thick. The thickness of first hard mask layer 245 is slightly thicker the than the thickness of core layer 115 (see FIG. 2.)

Figure 12:
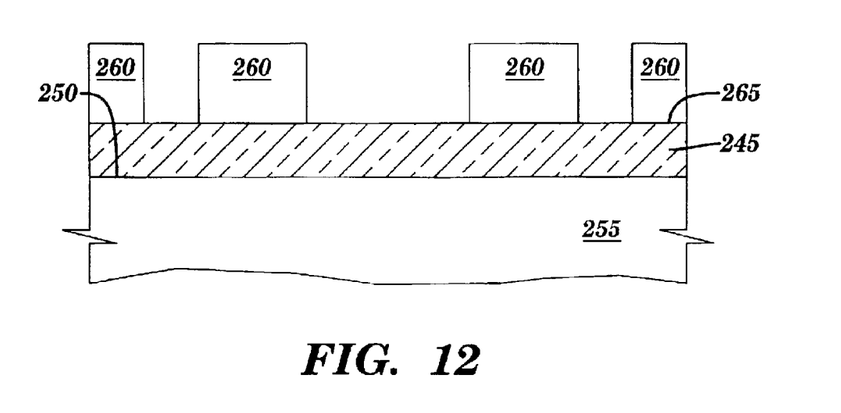

In FIG. 12, photoresist images 260 are formed, by well-known photolithographic methods, on a top surface 265 of first hard mask layer 245.

Figure 13:
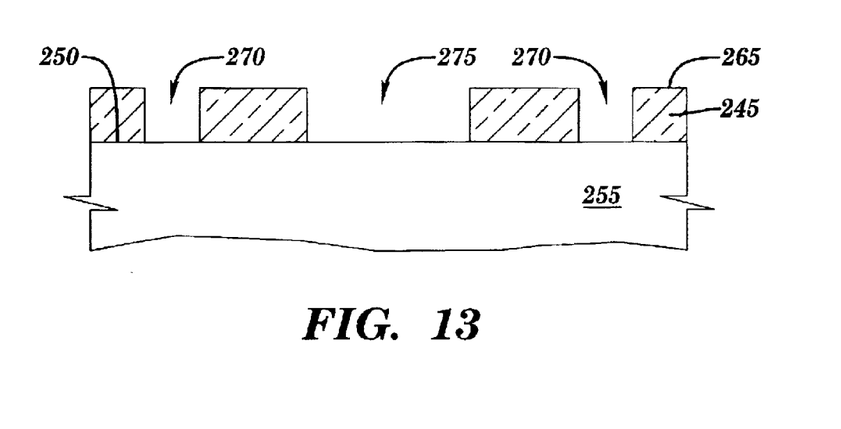

In FIG. 13, first trenches 270 and second trench 275 are formed in first hard mask layer 245 by removing portions of the first hard mask layer not protected by photoresist images 260 (see FIG. 12) down to top surface 250 of silicon substrate 255 using any one of a number of well-known RIE methods selective silicon oxides to silicon. Photoresist images 260 (see FIG. 12) are then removed by wet or dry stripping.

Figure 14:
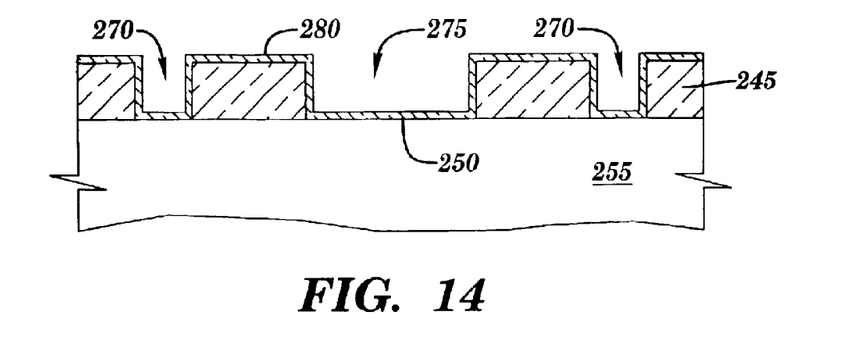

In FIG. 14, a second hard mask layer 280 of CVD oxide or TEOS oxide about 300 to 600 Å thick is conformally deposited on first hard mask layer 245. Alternatively, second hard mask layer 280 may be formed by a thermal oxidation of exposed silicon at the bottom of first trenches 270 and second trench 275.

Figure 15:
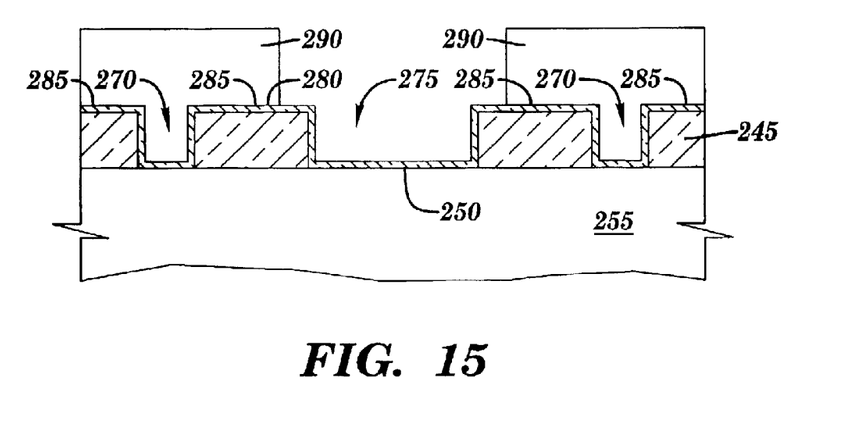

In FIG. 15, photoresist images 290 are formed, by well-known photolithographic methods, on a top surface 285 of second hard mask layer 280 immediately adjacent to first trenches 270 and over the first trenches, but not over first trench 275.

Figure 16:
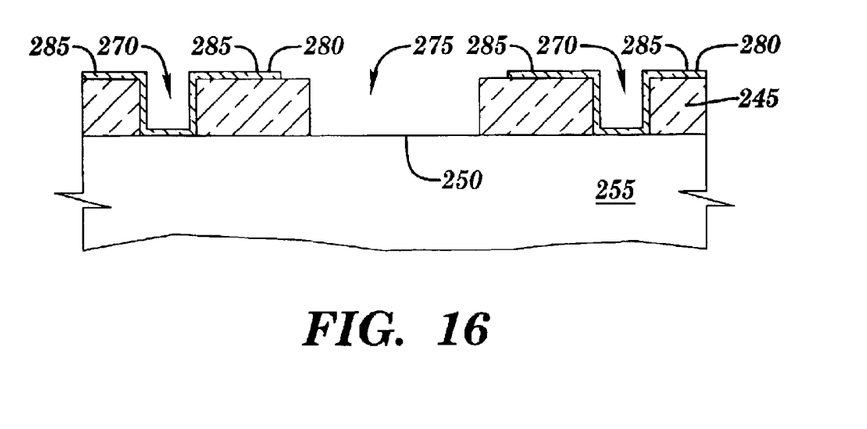

In FIG. 16, portions of the second hard mask layer 280 not protected by photoresist images 290 (see FIG. 15) are removed in second trench 275 down to top surface 250 of substrate 255 by wet-etching in dilute or buffered HF. Photoresist images 290 (see FIG. 13) are then removed by wet or dry stripping.

Figure 17:
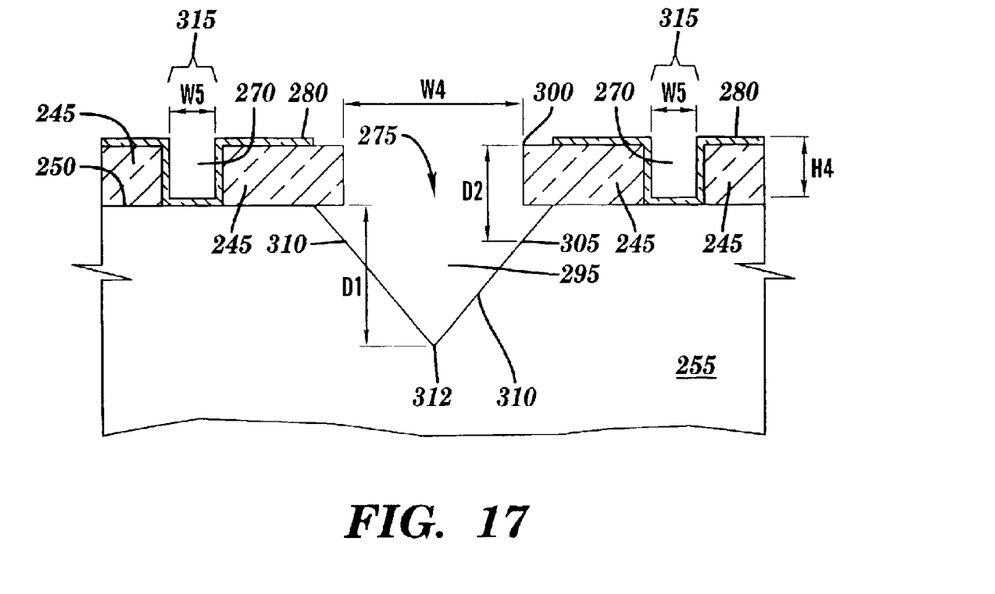

In FIG. 17, a V-shaped groove 295 is formed in silicon substrate 255 exposed in second trench 275 by etching in an aqueous or alcoholic solution of a strong base such as KOH, NaOH, tetramethylammonium hydroxide (TMAH) or ethylene diamine pyrocatechol (EDP.) Formation of V-shaped grooves in (100) silicon is well known. The V-shape is formed because the etch rate in the <111> crystallographic plane is faster than in any of the other planes. The depth "D1" (measured from top surface 250 of silicon substrate 255) of V-shaped groove 295 is primarily a function of width "W4" of second trench 275 and secondarily of etch time. "W4" must be at least equal to "W3" (see FIG. 9) plus an amount Δ1. The value of "W4" and etch time must also be adjusted such that a distance "D2" measured from an upper edge 300 of second trench 275 to a point 305 on sidewalls 310 of V-shaped groove 295, directly below the upper edge is equal to "H3" plus an amount Δ2 (see FIG. 9). Sidewalls 310 meet along an edge 312 centered under second trench 275. Alignment grooves 315 include first trenches 270 and portions of second hard mask layer 280 covering exposed surfaces of the trenches. Alignment grooves 315 have a width "W5" and a height "H4") "W5" is equal to "W1" plus an amount Δ3 and "H4" is equal to "H1" plus an amount Δ4 (see FIG. 9). In one example, Δ1, Δ2, Δ3 and Δ4 are about 250 to 1000 Å and may or may not be equal to one another.

Figure 17A:
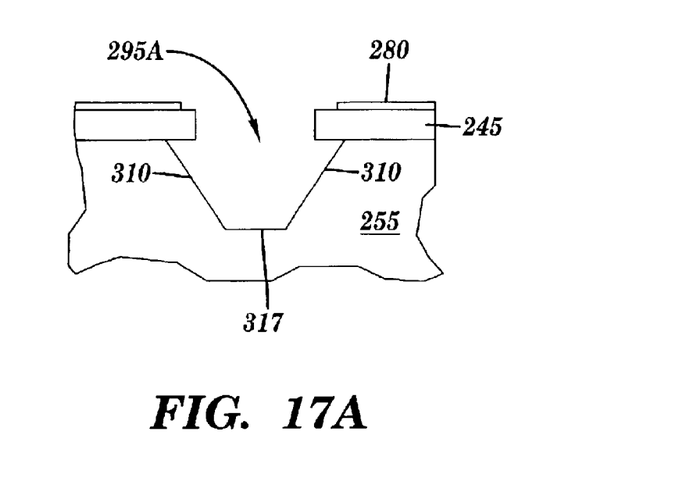

FIG. 17A illustrates an alternative shape for V-shaped groove 295 of FIG. 17. In FIG. 17A, sidewalls 310 of V-shaped groove 295A do not meet, but instead a flat bottom 317 is formed. Flat bottom 317 is formed simply by etching silicon substrate 255 for less time then that required for forming a "V."

Figure 18:
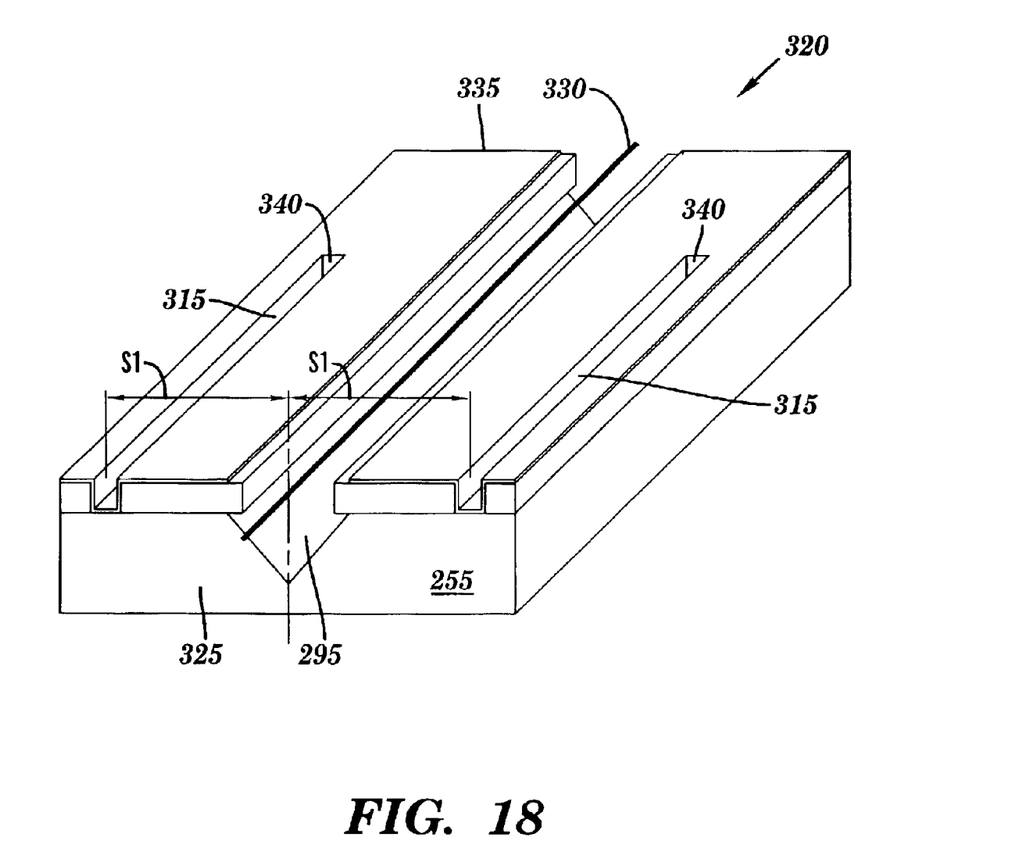
FIG. 18 is a three-dimensional isometric view of an alignment jig of the present invention.

FIG. 18 is a three-dimensional isometric view of alignment jig 320 of the present invention. In FIG. 18, alignment jig 320 is cut from substrate 255. At least a front surface 325 of alignment jig 320 is polished optically flat and perpendicular to a longitudinal axis 330 of the alignment jig. Alignment grooves 315 and V-shaped groove 295 extend along longitudinal axis 330. V-shaped groove 295 extends to a rear surface 335 of alignment jig 320. Alignment grooves 315 terminate, prior to reaching rear surface 335, in stops 340 of the alignment grooves. Alignment grooves 315 extend parallel to V-shaped groove 295. The centers of alignment grooves 295 are spaced distance "S1" from the center of V-shaped groove 295.

Figure 19:
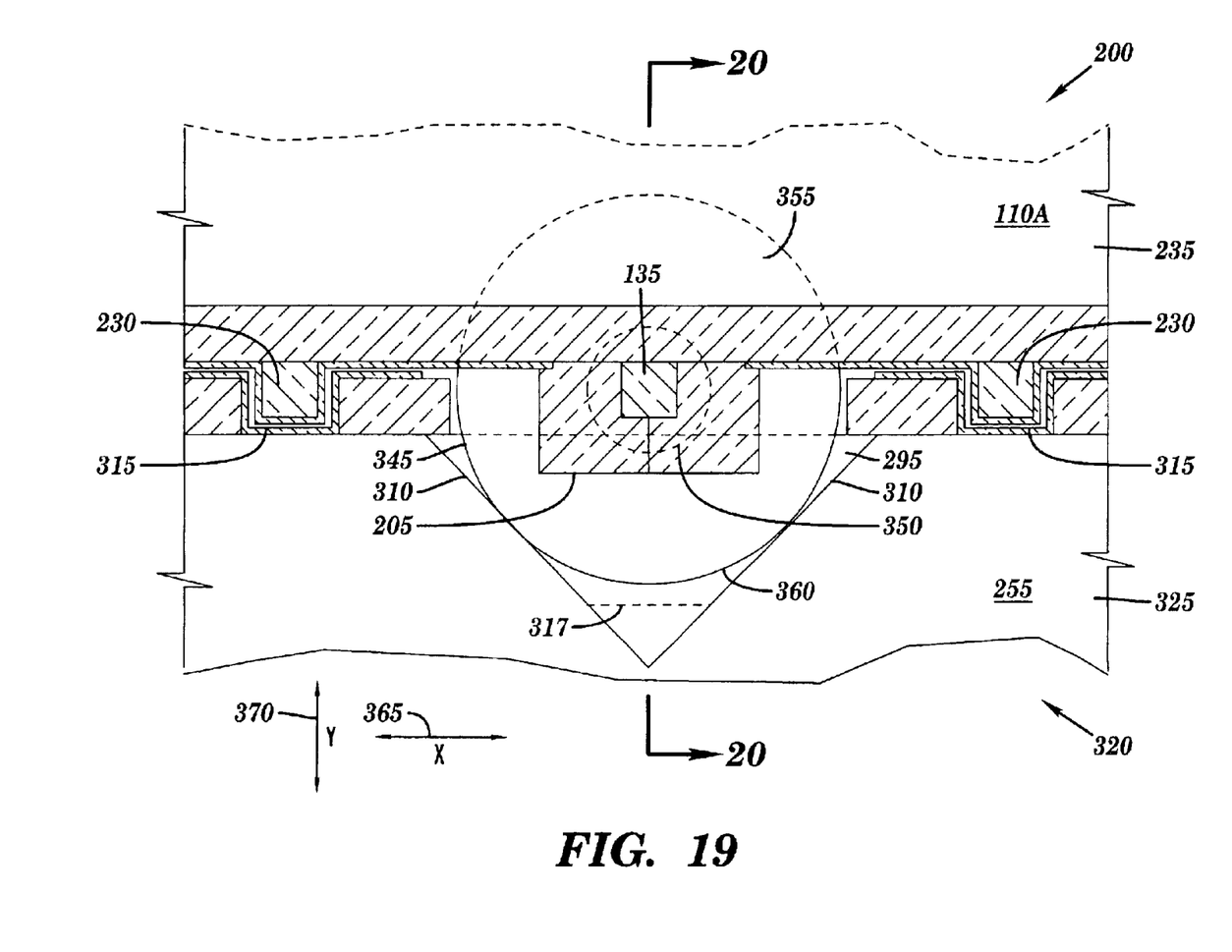
FIG. 19 is a front view illustrating use of the alignment jig of FIG. 18 to align the optical waveguide chip of FIG. 10 to an optical fiber according to the present invention.

FIG. 19 is a front view illustrating use of alignment jig 320 of FIG. 18 to align optical waveguide chip 200 of FIG. 10 to an optical fiber 345 according to the present invention. This view is from front surface 235 of waveguide chip 200 (see FIG. 10) and front surface 325 of alignment jig 320 (see FIG. 18). In FIG. 19, optical waveguide chip 200 is engaged into alignment jig 320. Alignment rails 230 on optical waveguide chip 200 slidably engage alignment grooves 315 in alignment jig 320. A portion of optical waveguide 205 is suspended in V-shaped groove 295. Optical fiber 345 is slidably engaged in V-shaped groove 295. Optical fiber 345 includes an optical fiber core 350 surrounded by an optical fiber cladding 355. An outer surface 360 of optical fiber 345 contacts sidewalls 310 of V-shaped groove 295. Core 135 of optical waveguide 205 is co-axially aligned to optical fiber core 350. Alignment along "X" axis 365 is provided by alignment guides 230 engaging alignment grooves 315. Alignment along "Y" axis 370 is provided by the depth of V-shaped groove 295. Since alignment rails 230 are self aligned to optical waveguide 205 and the spacing of the alignment rails and optical waveguide can be replicated, to an extremely high degree of accuracy and precision by modern lithographic technology, in the spacing of alignment grooves 315 and V-shaped groove 295, optical fiber 345 is essentially self aligned to the optical waveguide in the "X" and "Y" axes. In the case of a flat-bottomed V-shaped groove (see FIG. 17A) the location of flat bottom 317 relative to optical fiber 345 is indicated by a dashed line.

Figure 20:
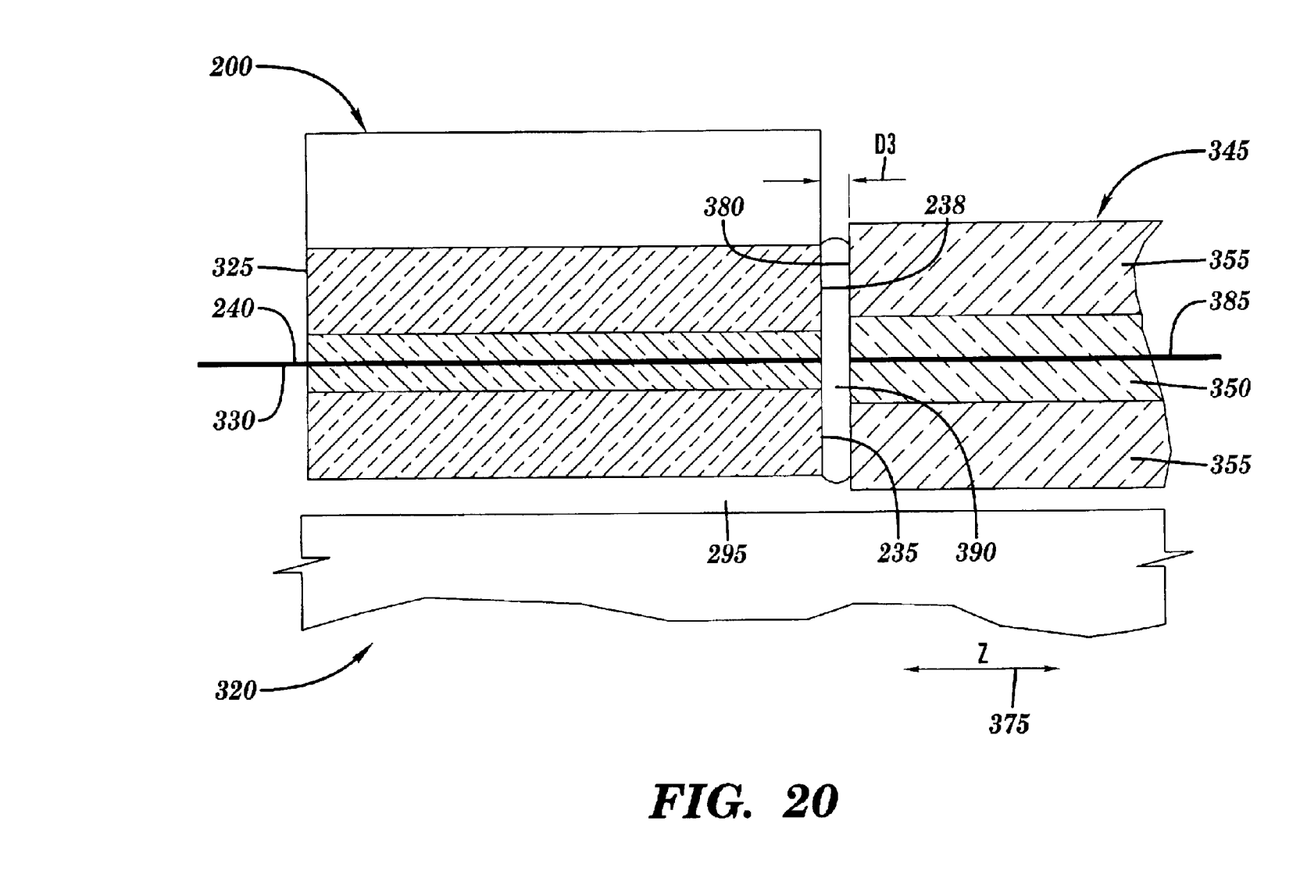
FIG. 20 is a partial cross-sectional view through 20—20 of FIG. 19 illustrating use of the alignment jig of FIG. 18 to align the optical waveguide chip of FIG. 10 to the optical fiber of FIG. 19 according to the present invention.

FIG. 20 is a partial cross-sectional view through 20—20 of FIG. 19 illustrating use of alignment jig 320 of FIG. 18 to align optical waveguide chip 200 of FIG. 10 to optical fiber 345 according to the present invention. In FIG. 20, optical waveguide chip 200 is positioned in alignment jig 320 by sliding the waveguide chip along "Z" axis 375 until alignment rails 230 contact stops 340 of alignment grooves 315 (see FIGS. 10, 18 and 19). Optical fiber 345 is positioned in V-shaped groove 295 and slid toward front surface 238 of optical waveguide 205 until a front surface 380 of the optical fiber is a distance "D3" from front surface 238 of the optical waveguide. (Front surface 380 of optical fiber 345 has been polished perpendicular to longitudinal axis 385 of the optical fiber by any one of several processes known to those skilled in the art.) In one example, "D3" is about 0 to 2 microns. An optical epoxy 390 is used to bond front surface 380 of optical fiber 345 to front surface 238 of optical waveguide 205.

Figure 21:
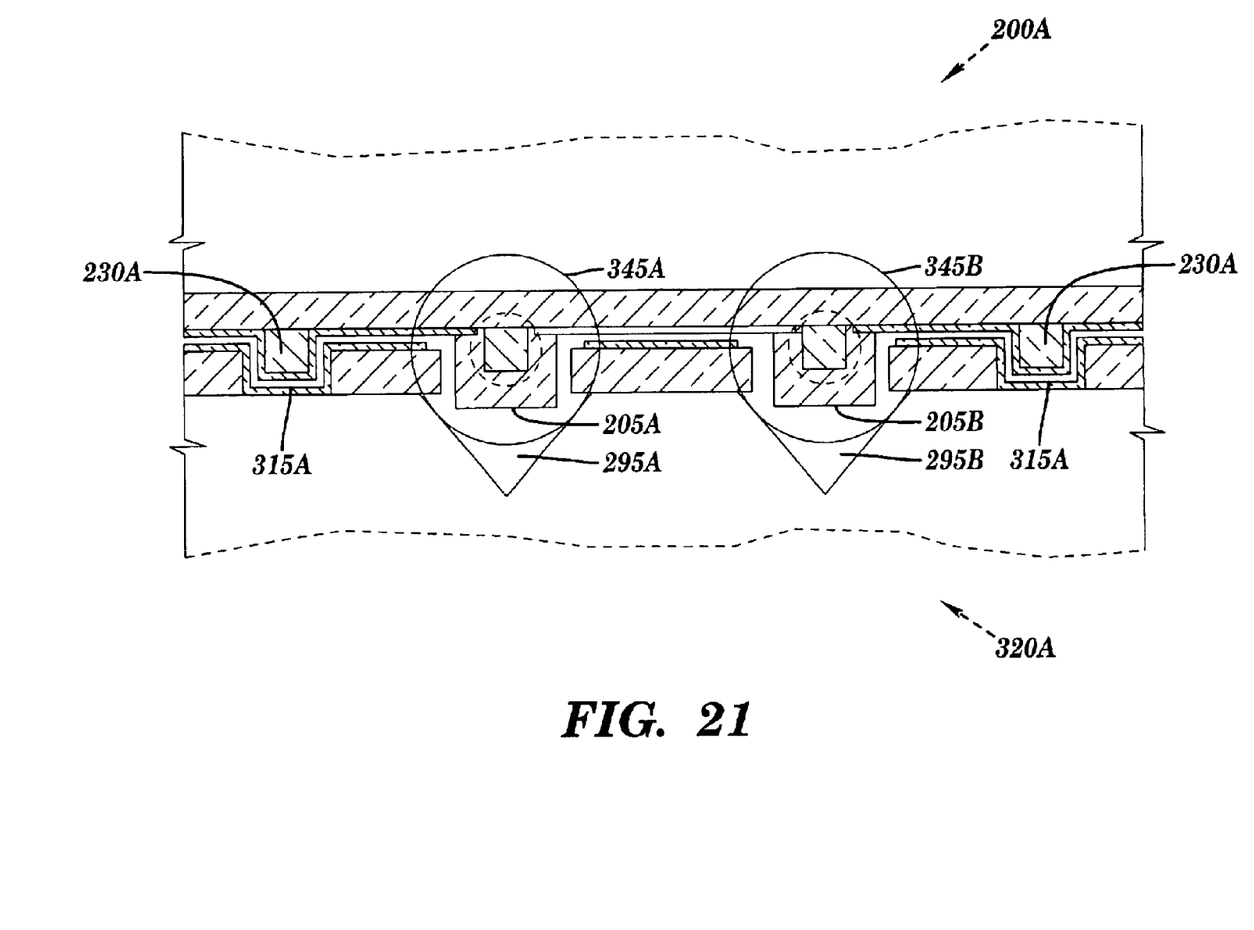
FIG. 21 is a front view illustrating use of an alignment jig to align an optical waveguide chip to a pair of optical fibers according to the present invention.

FIG. 21 is a front view illustrating use of alignment jig 320A to align optical waveguide chip 200A to a pair of optical fibers according to the present invention. In FIG. 21, optical waveguide chip 200A includes a first integrally formed optical waveguide portion 205A, a second integrally formed optical waveguide portion 205B and a pair of alignment rails 230A. Alignment jig 320A includes a first "V" groove 295A, a second V-shaped groove 295B, and a pair of alignment rails 230A. Alignment rails 230A of optical waveguide 200A are engaged in alignment grooves 315A of alignment jig 320A. A first optical fiber 345A is positioned in first V-shaped groove 295A and a second optical fiber 345B is positioned in second V-shaped groove 295B. First optical fiber 345A is self-aligned to a first integrally formed optical waveguide portion 205A of optical waveguide chip 200A. Second optical fiber 345B is self-aligned to a second integrally formed optical waveguide portion 205B of optical waveguide chip 200A. While two optic fibers and two optical waveguide portions are illustrated in FIG. 21, more than two optical fibers may be aligned and connected to more than two optical waveguide portions.

Figure 22:
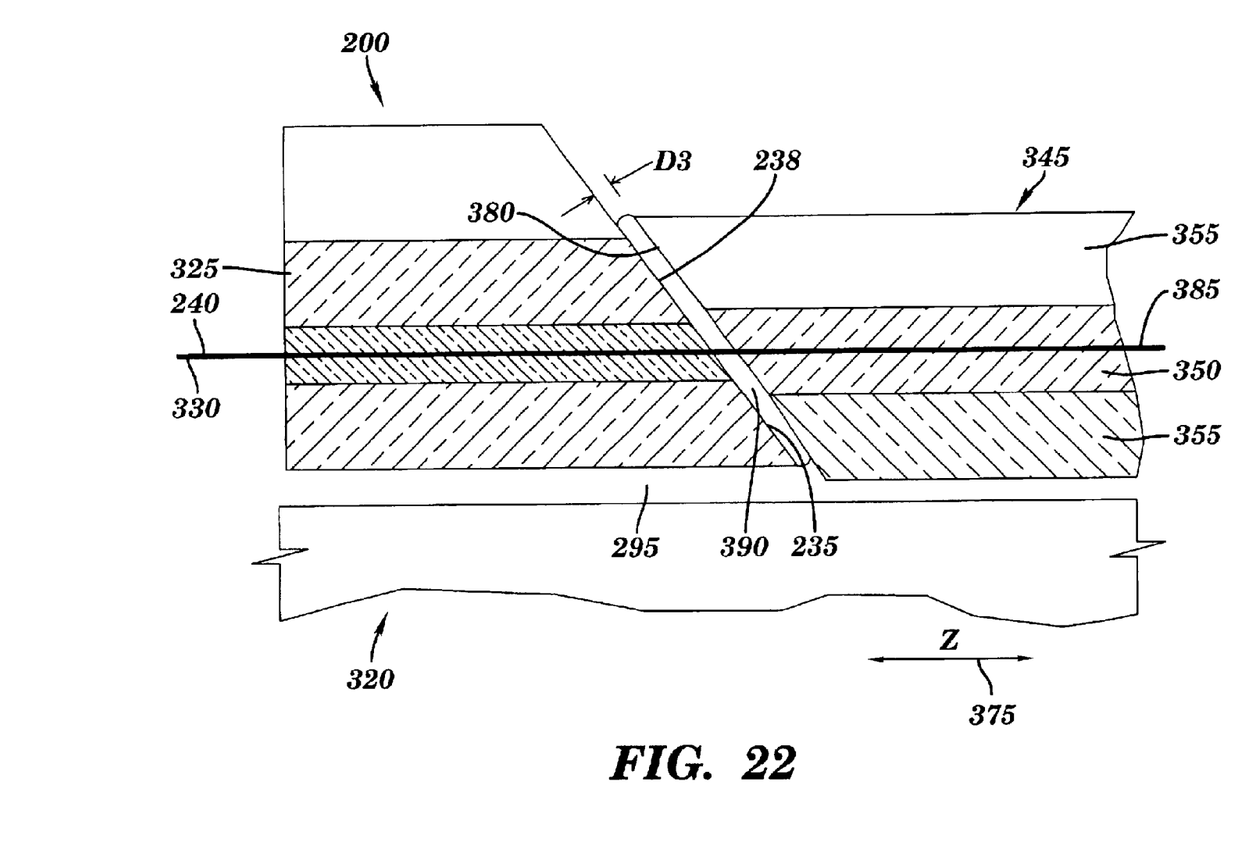
FIG. 22 is a partial cross-sectional view an alternative configuration of the optical waveguide chip and illustrating use of the alignment jig to align the alternative optical waveguide chip to an optical fiber according to the present invention.

FIG. 22 is a partial cross-sectional view an alternative configuration of the optical waveguide chip and illustrating use of the alignment jig to align the alternative optical waveguide chip to an optical fiber according to the present invention. In FIG. 22, optical waveguide chip 200 is positioned in alignment jig 320 by sliding the waveguide chip along "Z" axis 375 until alignment rails 230 contact stops 340 of alignment grooves 315 (see FIGS. 10, 18 and 19). Optical fiber 345 is positioned in V-shaped groove 295 and slid toward front surface 238 of optical waveguide 205 until a front surface 380 of the optical fiber is a distance "D3" from front surface 238 of the optical waveguide. Front surface 238 of optical waveguide 205 has been polished to a predetermined angle to longitudinal axis 140 by any one of several processes known to those skilled in the art. Front surface 380 of optical fiber 345 has been polished at the same predetermined angle to longitudinal axis 385 of the optical fiber by any one of several processes known to those skilled in the art In one example, "D3" is about 0 to 2 microns. Optical epoxy 390 is used to bond front surface 380 of optical fiber 345 to front surface 238 of optical waveguide 205.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. An apparatus for self-aligning an optical fiber to an optical waveguide comprising an optical waveguide chip including:

one or more optical waveguides formed on a first substrate, each optical waveguide having a protruding portion;

one or more alignment rails formed on said first substrate, each alignment rail spaced apart from each optical waveguide by a predetermined distance; and an alignment jig including:

one or more grooves formed in a second substrate, each groove adapted to receive one protruding portion and each groove supporting one optical fiber in alignment with one optical waveguide; and one or more alignment grooves formed on said second substrate, each alignment groove spaced apart from said grooves by said predetermined distance and adapted to mate with said alignment rails, said optical waveguides extending in a longitudinal direction, said alignment rails extending parallel to said optical waveguides in said longitudinal direction, said alignment grooves extending parallel to said grooves in said longitudinal direction, each said alignment groove including a stop acting as a physical barrier to stop motion in said longitudinal direction of said alignment rail within said alignment groove.

2. The apparatus of claim 1, wherein said physical barrier is located at an end of said alignment groove in said longitudinal direction.

3. The apparatus claim 1, wherein said first substrate includes a material selected from the group consisting of silicon, sapphire and quartz, and wherein said second substrate includes silicon.

4. The apparatus of claim 1, wherein alignment of each optical waveguide to each optical fiber in the "X" direction is controlled by a mating of said alignment rails to said alignment grooves, and wherein, alignment of each optical waveguide to each optical fiber in the "Y" direction is controlled by the depth of said groove.

5. An apparatus for self-aligning an optical fiber to an optical waveguide comprising an optical waveguide chip including:

one or more optical waveguides formed on a first substrate, each optical waveguide having a respective protruding portion;

one or more alignment rails formed on said first substrate, each alignment rail spaced apart from each optical waveguide by a predetermined distance; and an alignment jig including;

one or more grooves formed in a second substrate, each groove adapted to receive one protruding portion and each groove supporting one optical fiber in alignment with one optical waveguide; and one or more alignment grooves formed on said second substrate, each alignment groove spaced apart from said grooves by said predetermined distance and adapted to mate with said alignment rails, wherein said protruding portion includes a core portion and a cladding portion of said optical waveguide.

6. The apparatus of claim 5, wherein an index of refraction of the cladding portion is less than an index of refraction of the core portion.

7. The apparatus of claim 5, further comprising a cladding layer on the first substrate, wherein the cladding layer is disposed between the first substrate and the protruding portion.

8. The apparatus of claim 7, wherein an index of refraction of the cladding layer is less than an index of refraction of the core portion.

9. The apparatus of claim 7, wherein the cladding layer and the cladding portion are formed from a same material.

10. The apparatus of claim 7, wherein the cladding layer and the cladding portion are not formed from a same material.

11. The apparatus of claim 7, wherein the cladding portion is disposed on a top surface and on side surfaces of the core portion, wherein a protective layer is disposed on a top surface and on side surfaces of the alignment rails and is further disposed on the cladding layer, and wherein the protective layer is not disposed on a top surface of the cladding portion.

12. The apparatus of claim 11, wherein an edge portion of the protective layer extends under the cladding portion.

13. The apparatus of claim 12, wherein the edge portion of the protective layer does not extend under the cladding portion all the way to the core portion.

14. An apparatus for self-aligning an optical fiber to an optical waveguide comprising:
   an optical waveguide chip including:
      one or more optical waveguides formed on a first substrate, each optical waveguide including a cladding layer, said cladding layer extending over a top surface of said first substrate and a protruding portion, said protruding portion including a core portion and a cladding portion; and
      one or more alignment rails formed on top on said cladding layer, each alignment rail substantially co-planer with said core portion and spaced apart from each core portion by a predetermined distance; and
   an alignment jig including:
      one or more trenches in a thick layer on top of a second substrate and one or more grooves formed in said second substrate, each groove of the one or more grooves open to a trench of the one or more trenches;
      each groove adapted to receive one protruding portion and to support one optical fiber in alignment with one optical waveguide; and
      one or more alignment grooves formed in said thick layer, each alignment groove spaced apart from said grooves by said predetermined distance and adapted to mate with said alignment rails.

15. The apparatus of claim 14, wherein:
   said optical waveguides extend in a longitudinal direction and said alignment rails extend parallel to said optical waveguides; and
   said grooves extend in a longitudinal direction and said alignment grooves extend parallel to said grooves.

16. The apparatus of claim 14, wherein said alignment grooves include a stop.

17. The apparatus of claim 14, wherein said first substrate includes a material selected from the group consisting of silicon, sapphire and quartz, and wherein, said second substrate includes (100) silicon.

18. The apparatus of claim 14, wherein alignment of each optical waveguide to each optical fiber in the "X" direction is controlled by a mating of said alignment rails to said alignment grooves, and wherein, alignment of each optical waveguide to each optical fiber in the "Y" direction is controlled by the depth of said groove.

19. The apparatus of claim 14, further including a protective layer formed on side and top surfaces of said alignment rails.

20. A method for self-aligning an optical fiber to an optical waveguide, comprising:
   providing a first substrate;
   forming a first cladding layer on top of said first substrate;
   forming a core layer on top of said first cladding layer;
   etching said core layer to form a waveguide core and one or more alignment rails, each alignment rail spaced apart from said waveguide core by a predetermined distance;
   forming a second cladding layer on a top surface and on sidewalls of said waveguide core, said waveguide core and second cladding layer forming a protruding portion of said waveguide, said first cladding layer, said waveguide core and said second cladding layer forming said optical waveguide;
   providing a second substrate;
   forming a mask layer on top of said second substrate;
   simultaneously etching one or more trenches and one or more alignment grooves in said mask layer, each alignment groove spaced apart from said trench by said predetermined distance and adapted to mate with said alignment rails;
   etching a groove in said second substrate in each said trench, each groove and trench adapted to receive one protruding portion and to support one optical fiber such that a core of the optic fiber aligns with said waveguide core; and
   placing said first substrate onto said second substrate such that said alignment rails engage with said alignment grooves and said protruding portion is received in said groove and trench.

21. The method of claim 20, wherein:
   said optical waveguides extend in a longitudinal direction and said alignment rails extend parallel to said optical waveguides; and
   said grooves extend in a longitudinal direction and said alignment grooves extend parallel to said grooves.

22. The method of claim 20, wherein said first substrate includes a material selected from the group consisting of silicon, sapphire and quartz, and wherein, said second substrate includes (100) silicon.

23. The method of claim 20 wherein said first cladding layer includes a first material selected from the group consisting of thermal oxide, high-density plasma oxide, tetraethoxysilane oxide, boro-silicate glass and phosphorus-boro-silicate glass, and wherein, said second cladding layer includes a second material selected from the group consisting of high-density plasma oxide, tetraethoxysilane oxide, boro-silicate glass and phosphorus-boro-silicate glass.

24. The method of claim 20, wherein said core layer includes silicon-oxy-nitride.

25. The method of claim 20, wherein alignment of each waveguide core to each optical fiber core in the "X" direction is controlled by a mating of said alignment rails to said alignment grooves, and wherein, alignment of each waveguide core to each optical fiber core in the "Y" direction is controlled by the depth of said groove.

26. The method of claim 20, further including:
   forming a protective layer over said rails; and
   forming a second mask on a bottom and on sidewalls of said alignment grooves.

27. The method of claim 20, wherein said etching a groove in said second substrate in each said trench includes etching with a solution selected from the group consisting of aqueous KOH, aqueous NaOH, aqueous tetramethylammonium hydroxide, aqueous ethylene diamine pyrocatechol, alcoholic KOH, alcoholic NaOH, alcoholic tetramethylammonium hydroxide and alcoholic ethylene diamine pyrocatechol.

* * * * *